(12) United States Patent
Selvaggio

(10) Patent No.: US 7,437,849 B2
(45) Date of Patent: Oct. 21, 2008

(54) SECONDARY FISHING LURE

(76) Inventor: Thomas Selvaggio, 12 Winchester La., Jackson, NJ (US) 08527

( * ) Notice: Subject to any disclaimer, the term of this patent is extended or adjusted under 35 U.S.C. 154(b) by 0 days.

(21) Appl. No.: 11/818,515

(22) Filed: Jun. 14, 2007

(65) Prior Publication Data

US 2008/0000139 A1    Jan. 3, 2008

Related U.S. Application Data

(60) Provisional application No. 60/813,892, filed on Jun. 14, 2006.

(51) Int. Cl.
*A01K 85/12* (2006.01)
*A01K 85/00* (2006.01)

(52) U.S. Cl. .................. 43/42.05; 43/42.15; 43/42.11; 43/42.13; 43/42.36

(58) Field of Classification Search .............. 43/42.05, 43/42.11, 42.13, 42.14, 42.15, 42.16, 42.17, 43/42.36, 44.85
See application file for complete search history.

(56) References Cited

U.S. PATENT DOCUMENTS

| | | | | |
|---|---|---|---|---|
| 171,768 | A * | 1/1876 | Buel | 43/42.14 |
| 718,086 | A * | 1/1903 | Brown | 43/44.85 |
| 816,264 | A * | 3/1906 | Soper | 43/44.85 |
| 1,720,287 | A * | 7/1929 | Moore | 43/44.85 |
| 1,840,762 | A * | 1/1932 | Akervick | 43/44.85 |
| 1,948,823 | A * | 2/1934 | Lissy | 43/42.13 |
| 2,110,382 | A * | 3/1938 | Martin | 43/42.36 |
| 2,227,420 | A * | 1/1941 | Augenblick | 43/44.85 |
| 2,266,234 | A * | 12/1941 | Mitchell | 43/42.13 |
| 2,315,575 | A * | 4/1943 | Austad | 43/42.36 |
| 2,399,371 | A * | 4/1946 | Mendelson | 43/43.1 |
| 2,494,620 | A * | 1/1950 | Johnson | 43/44.85 |
| 2,575,248 | A * | 11/1951 | Clark | 43/42.11 |
| 2,576,880 | A * | 11/1951 | Jensen | 43/44.85 |
| 2,734,301 | A * | 2/1956 | Fuqua | 43/42.05 |
| 2,957,267 | A * | 10/1960 | Dempsey | 43/44.88 |
| 3,095,664 | A * | 7/1963 | Nichols | 43/42.36 |
| 3,118,244 | A * | 1/1964 | Coburn | 43/42.13 |
| 3,120,715 | A * | 2/1964 | Long | 43/43.1 |
| 3,245,171 | A * | 4/1966 | Henry | 43/42.14 |
| 3,253,363 | A * | 5/1966 | Steehn | 43/42.13 |
| 3,426,468 | A * | 2/1969 | Hinkson | 43/44.85 |
| 3,494,063 | A * | 2/1970 | Treaster | 43/42.14 |
| 3,514,891 | A * | 6/1970 | Krull | 43/44.87 |
| 3,694,952 | A * | 10/1972 | Matthews | 43/5 |
| 3,747,256 | A * | 7/1973 | Haddock | 43/42.13 |

(Continued)

FOREIGN PATENT DOCUMENTS

JP    09047191 A  *  2/1997

(Continued)

*Primary Examiner*—Darren W Ark
(74) *Attorney, Agent, or Firm*—Richard A. Clegg

(57) ABSTRACT

A secondary, preferably hook-free fishing lure is disclosed for use in combination with a primary hook-bearing fishing lure. The secondary lure is slidably attached to the fishing line, and moves along the line in an erratic fashion as the primary lure is worked through the water, to further attract fish to the primary lure. The secondary lure comprises one or more attractant elements, such as standard spoons or blades, directly or indirectly attached to a traveler element that slidably engages the fishing line and slides back and forth along the fishing line as the primary lure is moved, worked or jigged through the water.

3 Claims, 2 Drawing Sheets

U.S. PATENT DOCUMENTS

Figure 1:
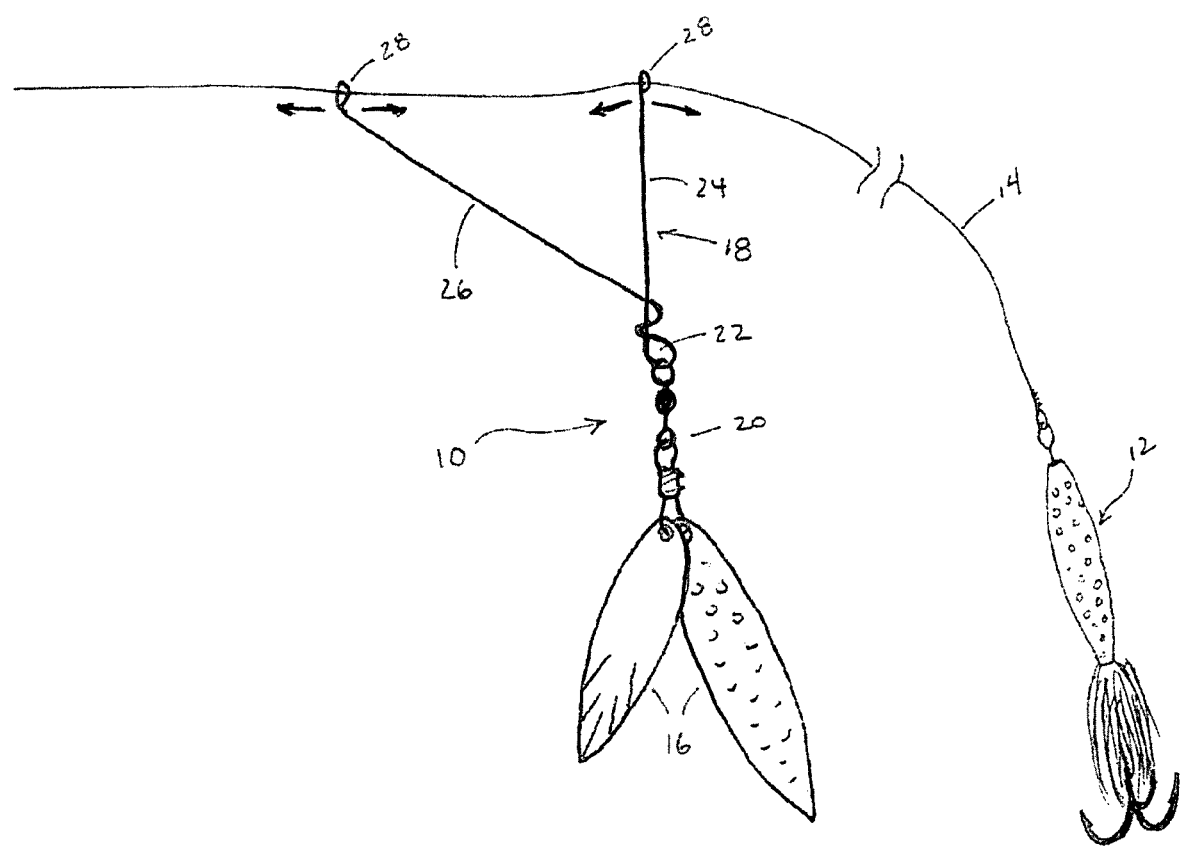

| | | | | |
|---|---|---|---|---|
| 3,783,549 A * | 1/1974 | Griggs | | 43/42.4 |
| 3,943,651 A * | 3/1976 | Erving | | 43/42.13 |
| 3,996,688 A * | 12/1976 | Hardwicke, III | | 43/42.11 |
| 4,033,065 A * | 7/1977 | Shannon | | 43/42.13 |
| 4,139,960 A * | 2/1979 | Chojnowski | | 43/43.1 |
| 4,161,838 A * | 7/1979 | Gapen | | 43/42.11 |
| 4,453,334 A * | 6/1984 | Opperman et al. | | 43/42.13 |
| 4,538,372 A * | 9/1985 | Petigoretz | | 43/27.4 |
| 4,671,007 A * | 6/1987 | Stanczyk | | 43/42.13 |
| 4,679,347 A * | 7/1987 | Stirtz | | 43/42.17 |
| 4,742,639 A * | 5/1988 | Gunn | | 43/42.13 |
| 4,750,290 A * | 6/1988 | Renaud | | 43/42.11 |
| 4,794,721 A * | 1/1989 | Rowe et al. | | 43/42.13 |
| 4,841,664 A * | 6/1989 | Baldwin | | 43/42.36 |
| 4,870,777 A * | 10/1989 | Morita | | 43/42.74 |
| 4,891,901 A * | 1/1990 | Baker, Jr. | | 43/42.13 |
| 5,090,151 A * | 2/1992 | Salminen | | 43/42.05 |
| 5,113,608 A * | 5/1992 | Hook | | 43/42.36 |
| 5,142,810 A * | 9/1992 | Radtchenko | | 43/42.36 |
| 5,226,253 A * | 7/1993 | Daniel et al. | | 43/42.13 |
| 5,253,446 A * | 10/1993 | Ogle | | 43/42.13 |
| 5,327,670 A * | 7/1994 | Tallerico | | 43/42.14 |
| 5,369,905 A * | 12/1994 | DeMars | | 43/42.74 |
| 5,381,621 A * | 1/1995 | Fuller | | 43/42.13 |
| 5,505,015 A * | 4/1996 | Delricco | | 43/42.13 |
| 5,560,141 A * | 10/1996 | Hodgin | | 43/42.15 |
| 5,647,163 A * | 7/1997 | Gorney | | 43/42.13 |
| 5,887,379 A * | 3/1999 | Lockhart | | 43/42.13 |
| 5,974,723 A * | 11/1999 | Taibi | | 43/42.13 |
| 6,047,493 A * | 4/2000 | Strampe | | 43/44.96 |
| H1865 H * | 10/2000 | Aoki | | 43/42.13 |
| 6,158,162 A * | 12/2000 | Loniello | | 43/42.13 |
| 6,185,857 B1 * | 2/2001 | Hnizdor | | 43/42.11 |
| 6,421,949 B1 * | 7/2002 | Schytte | | 43/43.12 |
| 6,560,915 B2 * | 5/2003 | Downey | | 43/42.36 |
| 6,675,524 B2 * | 1/2004 | McNally et al. | | 43/42.13 |
| 7,059,080 B2 * | 6/2006 | Bendel | | 43/42.15 |
| 2001/0029692 A1 * | 10/2001 | Imamura | | 43/42.36 |
| 2007/0169398 A1 * | 7/2007 | Taszarek | | 43/42.13 |

FOREIGN PATENT DOCUMENTS

| | | | |
|---|---|---|---|
| JP | 2001112379 A | * | 4/2001 |
| JP | 2001231406 A | * | 8/2001 |
| JP | 2002027870 A | * | 1/2002 |

* cited by examiner

SECONDARY FISHING LURE

CROSS-REFERENCES TO RELATED APPLICATIONS

This application claims the benefit of co-pending U.S. Provisional Application Ser. No. 60/813,892 filed Jun. 14, 2006, in the name of Thomas Selvaggio, entitled Secondary Fishing Lure.

BACKGROUND OF THE INVENTION

1. Field of the Invention

The present invention relates generally to the field of fishing lures.

2. Background Art

The field of fishing lures includes a wide variety of different designs. However, the vast majority of fishing lures are designed to be fixed onto a fishing line in a fixed and static location, either at the terminal end of the fishing line, or at a fixed location elsewhere on the line. Many lures that are attached to a fishing line have some moving elements to attract fish to the lure, but exhibit those moving elements from an overall static position on the line. The attachment of the lure at a static, fixed position on the lines limits the degree of variability of the lure's presentation to the fish. The present invention seeks to overcome this problem by providing a lure that is capable of moving along the fishing line, without remaining in a static and fixed position on the line.

BRIEF SUMMARY OF THE INVENTION

The present invention is a supplemental or secondary fishing lure that is designed preferably to be used in combination with a separate, traditional primary fishing lure that is attached toward the end of a fishing line. The secondary lure of the present invention slides back and forth along the fishing line in a random manner as the primary fishing lure is worked or jigged through the water, thereby acting as an additional attractant element to entice fish to take the primary lure.

In a basic aspect, the secondary fishing lure comprises one or more attractant elements, such as one or more shiny spoons, blades, spinners or other such lure elements that are well known in the fishing lure art. The attractant elements are connected to a separate element, referred to herein as a traveler, using, for example, a standard snap swivel or, more preferably, a barrel swivel with split rings for connecting to the traveler and the attractant element(s). The traveler includes two spaced apart loops or openings through which the fishing line is passed, thereby attaching the device to the line while allowing the device, including the traveler and the attached attractant element or elements (e.g., spinner blades or spoons), to travel and slide freely along the fishing line. As used herein, the term "traveler" means an element that can be attached onto a fishing line, by passing the fishing line through one or more openings, holes or loops in the traveler, such that the traveler can slide or "travel" freely along the length of the fishing line.

Preferably, the traveler comprises a length of bendable stainless steel wire, such as the type of wire that is commonly referred to as spinner bait wire, with two free ends, which is bent into a non-linear shape. Each of the free ends is formed into a closed loop, through which the fishing line can be passed. This provides two separate points of attachment of the traveler onto the fishing line. The attractant elements (e.g., blades or spoons) are connected to the traveler. In a particularly preferred embodiment, shown in FIG. 1, the traveler is formed from a length of spinner bait wire that is twisted into a generally v-shaped arrangement. A loop is formed at the vertex of the v-shape by twisting the rod, allowing for connection of the attractant elements to the traveler directly or via a snap swivel at that loop.

The invention encompasses a fishing lure comprising at least one attractant element connected to a traveler element, wherein the traveler is adapted to receive the fishing line through at least one loop in the traveler, whereby the traveler element and the connected attractant element are capable of sliding freely along the fishing line. In another embodiment, the traveler slidably engages the fishing line in a least two different positions along the length of the fishing line. In another embodiment, the traveler comprises a length of thin, bendable wire with two free ends, the wire being bent into a non-linear shape with a closed loop formed in each of the free ends, thereby permitting the fishing line to be passed through the closed loops to slidably attach the traveler onto the fishing line, and wherein the attractant elements are connected to the rod between the free ends.

BRIEF DESCRIPTION OF THE SEVERAL VIEWS OF THE DRAWING(S)

FIG. 1 of the drawing shows a first embodiment of the present invention.

Figure 2:
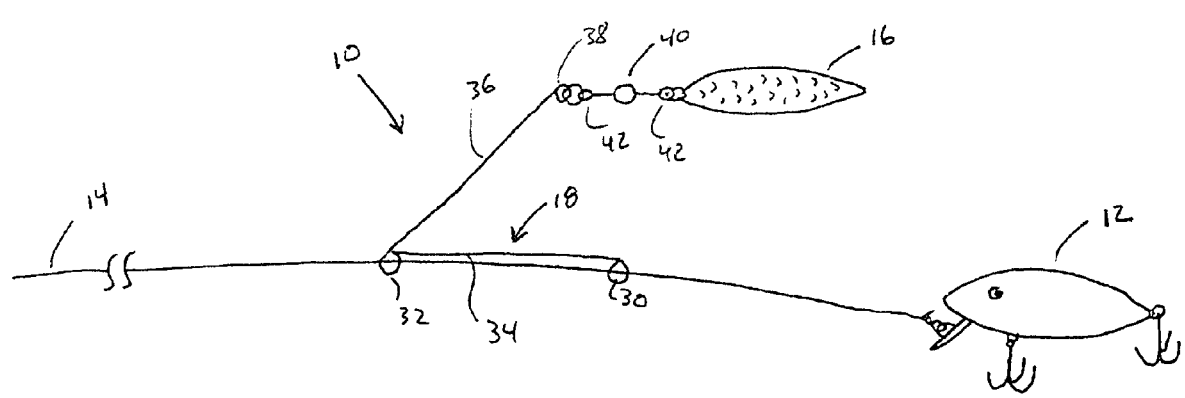

FIG. 2 of the drawing shows an alternate embodiment of the present invention.

DETAILED DESCRIPTION OF THE INVENTION

Referring to FIG. 1, the present invention is a secondary fishing lure 10 that is designed for use in combination with a separate primary fishing lure 12. The primary fishing lure includes one or more hooks, but the secondary lure preferably does not include any hook. Its primary purpose is to provide an additional fish attractant that works in combination with and supplements the separate primary lure, to increase the chance of a fish striking the primary lure.

The primary fishing lure 12 is fixed to a fishing line 14, at or near the end of the fishing line. The secondary lure 10 is slidably attached onto the fishing line first. The secondary lure would typically be attached to the fishing line above the primary lure (i.e., between the primary lure and the fisherman), although the secondary lure could also be attached below the primary lure if the primary lure is not attached to the end of the fishing line (for example, if additional lures or weights are attached to the line below the primary lure, in which case the secondary lure could be positioned between the primary lure and those additional lures or weights).

The secondary lure includes one or more attractant elements 16, such as standard blades or spinners. Examples of such attractive elements include the Wedge Blades sold by Stanley Jigs, Inc. of Huntington, Tex. The size of the blade or spinner can vary depending on the size of the primary lure, the weight of the line and the nature and size of the fish being sought. For typical freshwater fishing applications, blades in the range of about 1 to 3 inches are preferred. Different colors (e.g., bronze and silver) and sizes and textures (i.e., dimpled, non-dimpled) can be mixed to provide a more varied and potentially attracting glint or appearance. Different types of attractive elements can also be used in different combinations.

The attractant elements are connected to a traveler element 18, preferably using a barrel swivel with split rings, although an interlocking snap 20 can also be used, as shown in FIG. 1. The traveler 18 slidably engages the fishing line, permitting the device 10 to slide back and forth along the line as the primary lure 12 is worked or jigged through the water. In a preferred embodiment, the traveler is formed from a single length of generally rigid spinner bait wire, such as a 0.035-0.040 gauge wire made of stainless steel. The wire is bent into roughly a v-shape, with two separate leg portions. In the embodiment shown in FIG. 1, a loop 22 is formed at the junction of the two leg portions, by twisting the wire or rod. In a particularly preferred embodiment, the two leg portions form two legs of an approximate right (90 degree) triangle, with the first leg 24 forming the base of the triangle, the second leg 26 forming the hypotenuse and the portion of fishing line between the two legs forming the third side of the triangle 26 when the device is attached to the line. Each of the free ends of the wire is twisted to form a closed loop 28 of sufficient size to allow the line to slide freely through the loop. In a typical freshwater application, when the traveler is formed by twisting the rod, the first leg is approximately 1¼ inches long (excluding the loop at the end) and the second leg is approximately 1¾ inches long (excluding the loop at the end). The loops are approximately 1½ inches apart.

The traveler can also have a different shape or structure, provided it is capable of slidably attaching the attractant element to the fishing line, and moving freely along the line as the primary lure is worked through the water. For example, FIG. 2 shows an alternate embodiment in which the traveler 18 is again formed in a generally v-shape, but the line 14 passes through a first loop 30 at one free end of the wire and a second loop 32 at the vertex of the v-shaped traveler, with the line 14 running parallel to a first leg 34 of the v-shaped traveler. The second leg of the v-shape projects outward and away from the line, preferably raked slightly backward toward the primary lure 12, with the attractant element 16 attached to a third loop 38 at the free end of the second leg. In FIG. 2, the attractant element is attached to the traveler using a pair of split rings 42 and a barrel swivel 40. An advantage of this approach is that the angle between the first and second legs of the v-shaped traveler can be adjusted by bending the wire at the vertex to vary the rake of the second leg, which will vary the distance between the attractant element and the line and to the hydrodynamic characteristics of the device.

The traveler could also have other shapes, such as an arcuate shaped section of spinner bait wire with two free ends and loops at each end through which the line passes, with the attractant element attached to the wire at a point between the two free ends. It also could be a thin section of cylindrical tube though which the lines passes, with a section of spinner bait wire extending radially outward from the tube, with the attractant element attached to the free end of the wire.

A further advantage of the present invention is that the device can act as a partial guard or shield for the primary lure when the primary lure is being retrieved through moss, grass, reeds and other obstacles in the water, to prevent the primary lure from snaring or snagging on such obstacles.

In practice, the secondary lure 10 is positioned onto the fishing line in the desired location, for example, directly above a primary lure attached to the end of the fishing line, by passing the fishing line through the loops on the traveler. The primary lure(s) and any other weights or sinkers are affixed to the line. The primary lure and secondary lure are cast into the water in a normal fashion. The primary lure can be worked through the water in a random and non-continuous fashion, causing the primary lure to move up and down in the water and/or to move at different speeds through the water. As the primary lure moves up and down or at different speeds, the secondary lure 10 will also move up and down or at different speeds, and will change position relative to the primary lure. As a result of its movement, the secondary lure may reflect light and move in an erratic fashion, create additional and more complex visual stimulus and vibrations in the water. The attractant elements are believed to provide a more varied, complex and enticing set of attractive elements to the fish, in combination with the primary lure.

I claim:

1. A fishing lure in combination with a fishing line, the combination comprising:
    a traveler element, the traveler element including a first leg and a second leg, the first leg having a proximal end and a distal end, the second leg having a proximal end and a distal end, the proximal ends of the first and second legs together forming a vertex, a first loop being located at the vertex, the first leg having a second loop at the distal end thereof, the fishing line slidably passing through the first and second loops so as to extend substantially parallel to the first leg such that the traveler will slide freely along the fishing line;
    an attractant element connected to the distal end of the second leg of the traveler by a connector, the attractant element comprising a spoon, blade or spinner; and
    a primary fishing lure having a hook, the primary fishing lure being attached to the fishing line such that the second loop is located between the first loop and the primary fishing lure along a length of the fishing line.

2. The combination of claim 1 wherein the connector is a swivel.

3. The combination of claim 1 wherein the connector is a ring.

* * * * *